United States Patent Office 2,987,713
Patented June 6, 1961

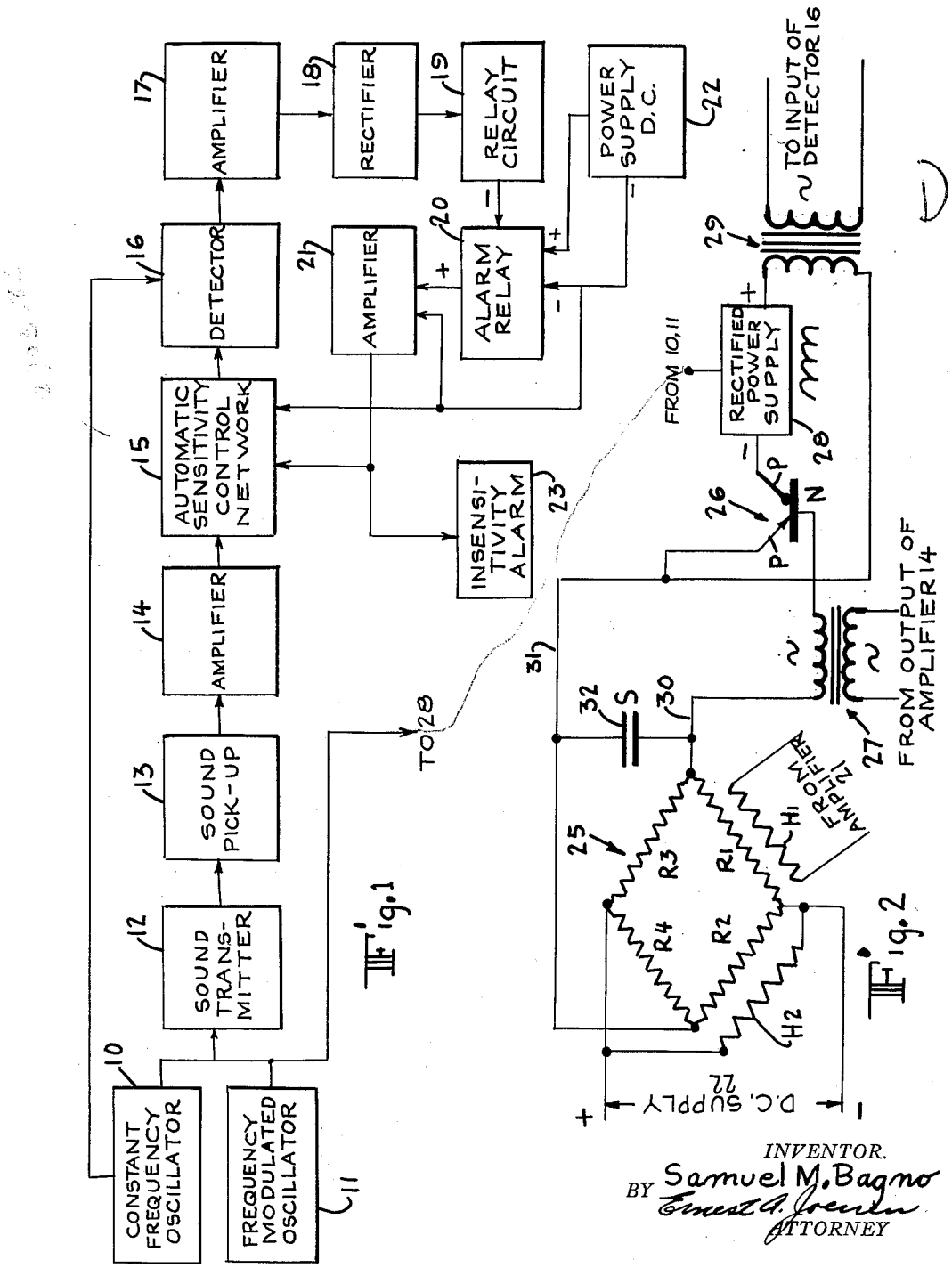

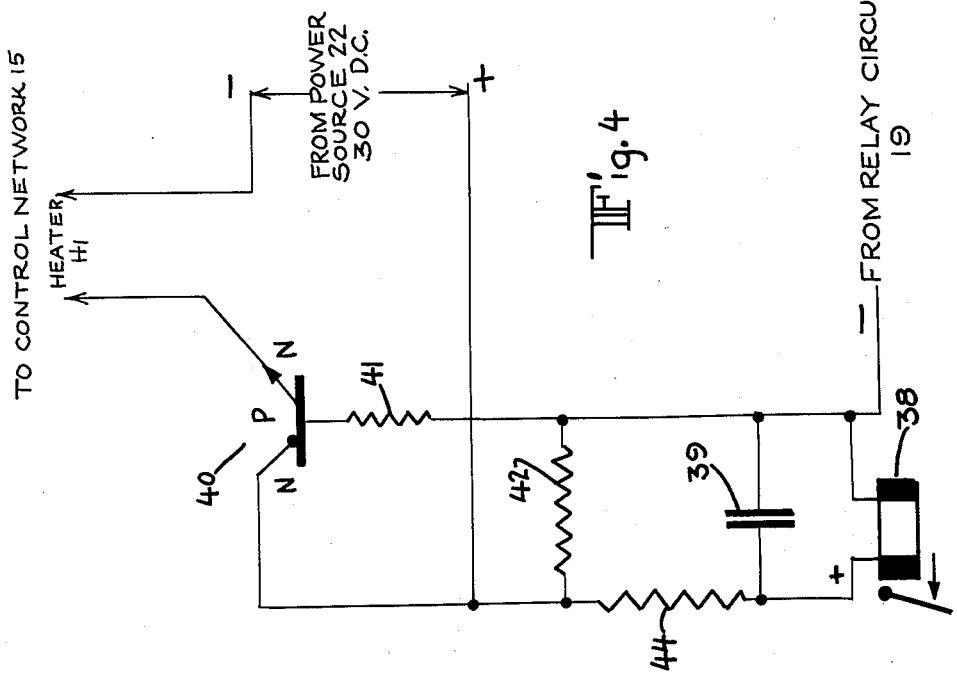
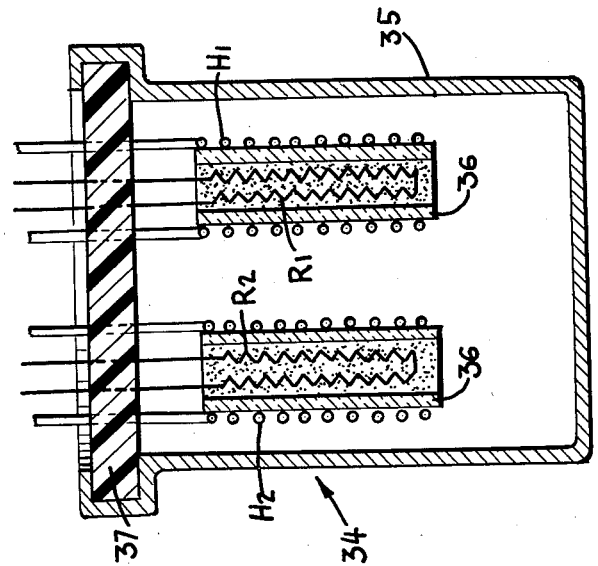

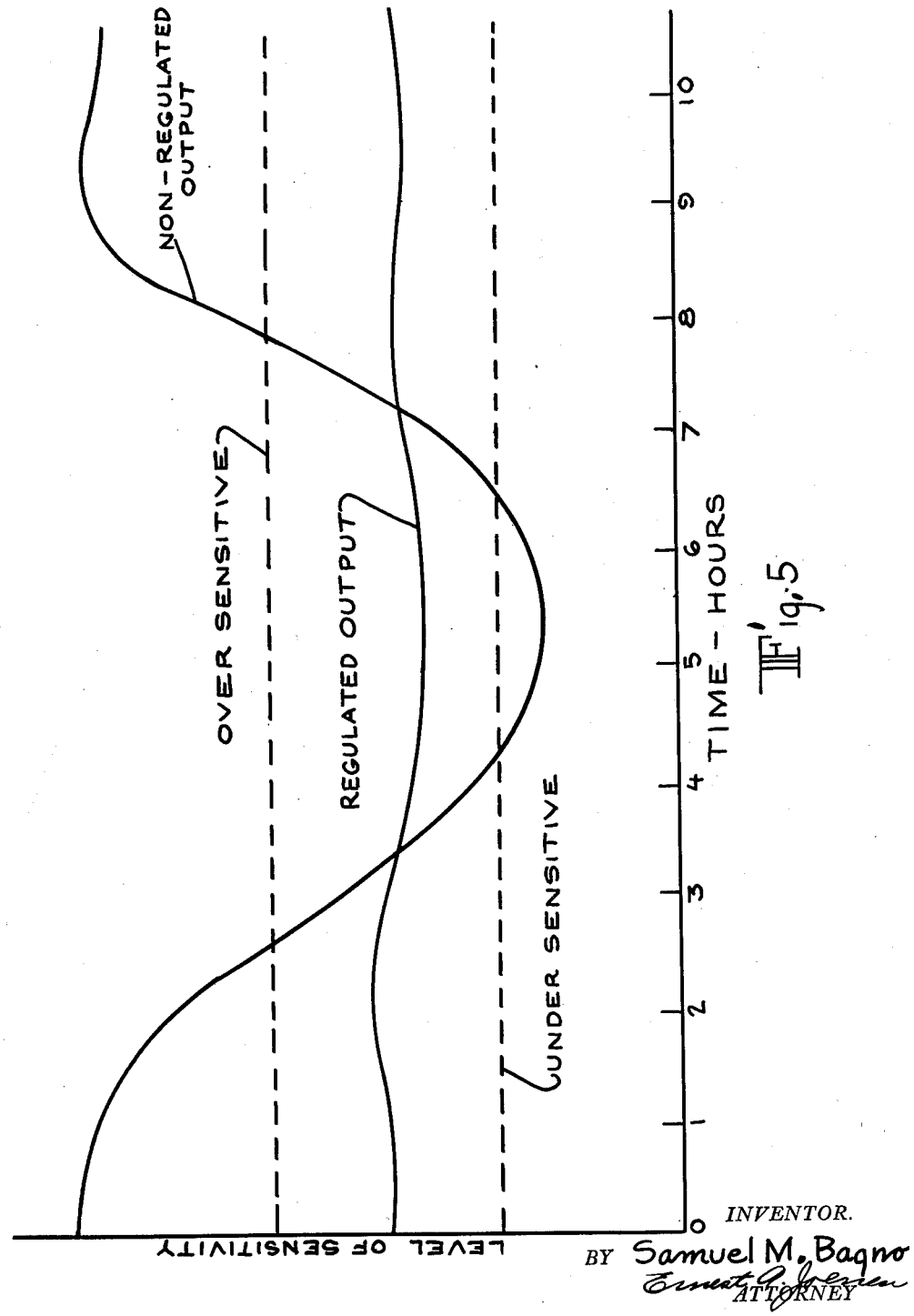

2,987,713
SENSITIVITY CONTROL OF APPARATUS FOR DETECTING DISTURBANCES IN AN ENCLOSURE
Samuel M. Bagno, Belleville, N.J., assignor to Walter Kidde & Company, Inc., Belleville, N.J., a corporation of New York
Filed July 12, 1957, Ser. No. 671,571
8 Claims. (Cl. 340—258)

The present invention relates to apparatus for detecting disturbances in an enclosure by giving an alarm in response to the detection of changes in frequency of generated and received radiations due to disturbances in the enclosure, such apparatus being disclosed in my prior United States Patent No. 2,655,645, and, more particularly, to the automatic control of the sensitivity of such apparatus in a manner which is an improvement over my copending application for Letters Patent of the United States, Serial No. 641,901, filed February 25, 1957, now Patent No. 2,903,683, September 8, 1959.

One of the problems encountered in connection with the operation of apparatus such as disclosed in my prior patent is that the sensitivity is affected by changes in the acoustical properties of an enclosure. These changes are primarily due to changes in the acoustic absorption of the enclosure and changes in the acoustic absorption of the air within the enclosure.

The amount of acoustic energy absorbed by the enclosure depends upon its geometrical configuration, that is, its ability to reflect energy waves rather than to absorb the same. Air pockets caused by open closets or drawers or niches tend to absorb energy rather than to reflect the same. Thus, should such pockets be closed off in different combinations, the energy absorbed by the enclosure varies appreciably. Also, variable loading of the enclosure changes the acoustic absorption thereof.

The acoustic absorption of the air varies appreciably throughout each day and depends upon a number of factors which can produce a multitude of combinations affecting the acoustic absorption of air. Among these factors are changes in relative humidity, temperature, chemical composition of the air and the amount of particles in the air.

It is conceivable that, under certain extreme conditions such as might be caused by the worst combination of changes in the loading and acoustic conditions of a premises, a very great change in sensitivity might occur. Thus, should the sensitivity of the appartus be adjusted under such a given set of conditions to detect a disturbance caused by a human being moving about in a room, a change in acoustic absorption to one extreme would make the apparatus oversensitive and detect a mouse, while a change to the other extreme would make the apparatus undersensitive and incapable of detecting even an elephant. In one case, the apparatus might give a false alarm, in the other case, an intruder might escape detection.

In Patent No. 2,903,683 referred to herein, it is proposed to control the sensitivity of apparatus for detecting disturbances in an enclosure which gives an alarm in response to the detection of changes in frequency of generated and received radiations by generating a signal periodically and utilizing a normally balanced capacitance-type bridge under the control of the signal for periodically adjusting the input to the detector to control its sensitivity within tolerable limits.

Accordingly, an object of the present invention is to overcome the difficulties heretofore experienced in a more simple, practical and economical manner.

Another object is to provide improved automatic sensitivity control for disturbance detecting apparatus of the type indicated herein.

A further object is to provide such apparatus which varies in sensitivity directly to possible variations in the amplifying system and the acoustical properties of the enclosure within very close limits.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by generating energy radiations at a substantially constant high frequency for detecting disturbances in the enclosure, generating energy radiations at another frequency, interacting both radiations to produce a low frequency signal, and utilizing the amplitude of the low frequency signal to control the output of a normally balanced heat-type resistance bridge fed to the input of the detector or the alarm controlling circuits and thereby vary the sensitivity of the apparatus in relation to changes in the acoustical properties of the enclosure.

A preferred embodiment of the invention has been chosen for purposes of illustration and description, and is shown in the accompanying drawings, forming a part of the specification, wherein:

FIG. 1 is a block diagram of an apparatus for detecting disturbances in an enclosure which embodies the sensitivity control in accordance with the invention.

FIG. 2 is a circuit diagram of a sensitivity regulating network with which the present invention is primarily concerned.

FIG. 3 is a schematic sectional view of a resistor-heater unit used in the network shown in FIG. 2.

FIG. 4 is a circuit diagram of an amplifier network for the network shown in FIG. 2.

FIG. 5 is a graph illustrating the sensitivity of the apparatus in relation to the acoustical properties of an enclosure over about a ten hour period, with and without regulated sensitivity.

Referring to the drawings in detail, a block diagram is shown in FIG. 1 which illustrates the essential components of the apparatus in accordance with the present invention including the components, or their equivalents, of the apparatus disclosed in the patents referred to herein and to which the present invention is applied. Thus, for a better understanding of the present invention in relation to its field of application, the block diagram will be described first with reference only to the prior apparatus.

Generally described, one form of such prior apparatus comprises a constant frequency oscillator 10, a frequency modulated oscillator 11 which cooperates with the oscillator 10 as described hereinafter, a sound transmitter 12 connected to the outputs of the oscillators 10 and 11 and adapted to radiate a standing sound wave energy pattern within an enclosure and a control signal, a sound pick-up 13 for receiving sound energy radiation and transducing the same to electrical radiations, a high frequency amplifier 14 having its input connected to the output of the sound pick-up, an automatic sensitivity control network 15 having an input operatively connected to the output of the amplifier 14, a detector 16 having an input connected to the output of the network 15 and having an input operatively connected to the constant frequency oscillator 10 for giving a fluctuating current output upon the detection of frequency changes between the transmitted and received radiations and oscillations, a low frequency amplifier 17 having its input connected to the detector output, a rectifier 18 having its input connected to the output of the amplifier 17, a relay circuit 19 having its input connected to the output of the rectifier, and a relay and alarm network 20 having its input connected to the output of the relay circuit, the network 15 having a compensating input under the control of the relay circuit output.

As described in greater detail in Patent No. 2,655,645 referred to herein, motion of an intruder or another disturbance within the enclosure sought to be detected produces a "Doppler" frequency in the wave pattern, whereby the received frequency becomes either greater or less or with multiple reflection both greater or less simultaneously than the transmitted frequency. This change in frequency is of a relatively low order and is detected by the detector 16, whereupon the detector generates a signal which is amplified and rectified and is caused to operate the alarm 20.

Since the amplitude of the received signal going into the detector can vary because of acoustical changes in the enclosure or sensitivity changes in the apparatus itself and the amplitude of the disturbance in the enclosure may be of various magnitudes depending on the size of the moving object, there is no assurance that the detector will be sensitive at all times to a disturbance of a minimum amplitude which is to be detected and that the detector will be insensitive at all times to a disturbance of a maximum amplitude which is not to be detected.

The sensitivity of the apparatus so far described, in general, is controlled by the interaction of the signals generated by the oscillators 10 and 11 which causes the detector to generate in the final output a low frequency pulse in the manner about to be more fully described. This pulse is amplified and rectified and is conducted to the automatic sensitivity control network 15 which controls the amplitude of the signal the detector receives from the amplifier 14 on an inverse order of magnitude in relation to the amplitude of the pulses.

As disclosed in Patent No. 2,903,683 referred to herein, the oscillator 10 may generaate radiations having a substantially constant frequency of about 19.2 kilo-cycles per second, and the oscillator 11 may generate radiations having a modulated frequency within a band ranging from about 14 to about 24 kilo-cycles per second. Thus, when these radiations pass through the detector 16, a pulse is generated each instant the modulated frequency approaches the constant frequency. By the selection of the foregoing frequency values, such pulses are generated at about one second intervals.

The amplitude of the pulses for any fixed acoustic condition within the enclosure varies with the phase relationship of the voltage of the constant frequency radiations and the modulated frequency radiations at the instant their frequencies coincide. When these radiations are exactly in phase at the time these frequencies are equal, the pulse will be of a maximum value, and, when they are exactly 90° out of phase, the value of the pulse will be nearly zero. Over a period of several minutes, the pulse amplitude is varied throughout the entire gamut of the phase relationship, whereby the average amplitude of the pulses over such a period will provide a good indication of the acoustic properties of the enclosure change, such change is reflected by the change in average pulse amplitude.

The amplified and rectified pulses pass through the relay circuit together with such steady state unidirectional current which results from the detection of frequency changes between transmitted and received radiations and are conducted to the relay and alarm network. This network is rendered operative by the steady state current, but is rendered insensitive to the pulses by utilizing a slow acting relay arrangement.

For example, as shown in Patent No. 2,903,683 referred to herein, the relay and alarm network may comprise a relay, a resistor connected in series with the relay across the relay circuit output, a capacitor shunted across the relay, to provide a time delay arrangement, and an indicating device, such as a light or bell or the like, under the control of switch contacts of the relay which has its output connected to the sensitivity control network 15. A direct current source 22 powers the relay circuit 19, the alarm relay 20 and the amplifier 21. An insensitivity alarm 23 is connected to the output of the amplifier 21 and gives an indication when the amplifier output drops below a predetermined minimum value.

In FIG. 2, a wiring diagram is shown which illustrates the automatic sensitivity control network 15. This network generally comprises a direct current powered normally balanced resistance type bridge 25 adapted to be modified by variations in signal amplitude as about to be described, a P-N-P type transistor 26 connected to the D.C. output of the bridge and coupled to the A.C. output of the amplifier 14 through a transformer 27, and a source of unidirectional direct current 28 which may be derived by rectifying the output of the oscillators 10 and 11, thus isolating the power supply for the transistor 26 direct current-wise from the source 22. In this manner the transistor is provided with a pulsating D.C. output which is converted to alternating current by a transformer 29 coupled to the input of the detector 16. If desired, the source 28 could be a battery.

The bridge 25 comprises resistors $R_1$ and $R_2$ connected in one side and resistors $R_3$ and $R_4$ connected in the other side, and heaters $H_1$ and $H_2$ for the resistors $R_1$ and $R_2$, respectively. The negative and positive terminals of the direct current source 22 are connected across the junction of the resistors $R_1$ and $R_2$ and the junction of the resistors $R_3$ and $R_4$, respectively. The heater $H_1$ is connected across the D.C. output of the amplifier 21, the heater $H_2$ is connected across the source 22, the conductors 30 and 31 are connected to the junction of the resistors $R_1$ and $R_3$ and the junction of the resistors $R_2$ and $R_4$, respectively to provide the bridge output connection.

In this manner, the bridge remains in balance when the heaters $H_1$ and $H_2$ supply the same heat to adjust the resistance of their resistors $R_1$ and $R_2$ to the same value, whereby the bridge can be unbalanced in either direction when the inputs of the heaters vary and cause them to heat their resistors differently.

For example, when the heater $H_1$ is hotter than the heater $H_2$, the resistor $R_1$ is less conductive than the resistor $R_2$ and current flows through the conductor 30 towards the right and through the conductor 31 towards the left. Similarly, when the heater $H_2$ is hotter than the heater $H_1$, the resistor $R_1$ is more conductive than the resistor $R_2$ and current flows through the conductor 30 towards the left and through the conductor 31 towards the right.

In the event the bridge is in balance when no heat has been applied to the heaters and the heater $H_1$ is hotter than the heater $H_2$, the resistor $R_1$ then is less conductive than the resistor $R_2$ and current flows through the conductor 30 towards the right and through the conductor 31 towards the left. Similarly, under these conditions when the heater $H_2$ is hotter than the heater $H_1$, the resistor $R_1$ is more conductive than the resistor $R_2$ and current flows through the conductor 30 towards the left and through the conductor 31 towards the right.

The base (N) of the transistor 26 is connected to the conductor 30 through the secondary or output coil of the transformer 27, the emitter (P) of the transistor is connected to the conductor 31 and to the positive terminal of the battery 28 through the primary or input coil of the transformer 29, and the collector (P) of the transistor is connected to the negative terminal of the battery 28. A capacitor 32 is connected across the conductors 30 and 31 to short circuit the A.C. component but not the D.C. bias from the bridge.

Thus, when the signal from the relay circuit 19 passing through the amplifier 21 to the heater $H_1$ has a stronger output than the output of the source 22 supplied to the heater $H_2$, the heater $H_1$ causes the resistor $R_1$ to become less conductive than the resistor $R_2$, whereby the bridge is unbalanced in the direction to cause current to flow through the conductor 30 towards the right and increase the bias on the base of the transistor. This reduces the current flow from the emitter to the collector in proportion to the degree of unbalance of the bridge and proportionately reduces the output of the transformer 29 which is coupled to the input of the detector 16.

Likewise, when the signal from the relay circuit 19 passing through the amplifier 21 to the heater $H_1$ has a weaker output than the output of the source 22 supplied to the heater $H_2$, the heater $H_1$ is less effective and causes the resistor $R_1$ to become more conductive than the resistor $R_2$, whereby the bridge is unbalanced in the direction to cause current to flow through the conductor 30 towards the left and decrease the bias on the base of the transistor. This increases the current flow from the emitter to the collector in proportion to the degree of unbalance of the bridge and proportionately increases the output of the transformer 29 which is coupled to the input of the detector 16.

In FIG. 3, a heater-resistor unit 34 is shown which includes the resistors $R_1$ and $R_2$ and the heaters $H_1$ and $H_2$. This unit comprises a metallic envelope 35 having an opening at its upper end, a pair of glass tubes 36 each having one of the heaters coiled about the exterior thereof and having one of the resistors mounted therein by a mass of resin such as an epoxy resin, and a closure 37 for the envelope opening through which the lead wires or terminals of the resistors and heaters extend for connection in the network. The envelope is first evacuated and the closure is then applied to provide an airtight seal for the opening. In this manner, the resistance of the resistors and the heaters is not affected by ambient temperature changes.

The heating and cooling cycles of the resistors are symmetrical in this unit because the resistors are heated from the outside and cool from the inside. When the system is first put into operation both heaters are cold and the bridge is in balance whereby no signal gets through to create an overload condition.

The alarm relay 20 and the amplifier network 21 and the manner in which they are connected to the relay circuit and the D.C. power supply 22 are shown in FIG. 4.

The alarm relay includes a relay 38 and a capacitor 39 connected across the relay to delay its operation. The relay has one of its terminals connected to the negative side of the relay circuit 19 and has its other terminal connected to the positive side of the D.C. power source 22.

The amplifier network includes a transistor 40 of the N-P-N type which has its base (P) connected to the negative side of the relay circuit 19 through a resistor 41 and has its collector (N) connected to the positive side of the D.C. power source 22. A resistor 42 is connected in parallel with the capacitor 39 across the negative side of the relay circuit 19 and the positive side of the D.C. power source 22 for feeding pulses from the relay circuit to the collector of the transistor, and an isolating resistor 44 is connected in series with the capacitor 39 and the resistor 42, whereby these pulses are not affected by the capacitor 39. One terminal of the heater $H_1$ is connected to the emitter (N) of the transistor and the other terminal thereof is connected to the negative side of the D.C. power source 22.

With this arrangement, as the output of the relay circuit 19 becomes stronger, more bias is put on the transistor base to proportionately decrease the power supplied to the heater $H_1$. Conversely, as the output of the relay circuit becomes weaker, less bias is put on the transistor base to proportionately increase the power supplied to the heater $H_1$. Thus, in this manner, as the change in acoustic properties within an enclosure tend to make the detecting system more receptive to disturbances, the system is proportionately de-sensitized and vice versa.

In FIG. 5, the results of a test are illustrated which compares the regulated output and the non-regulated output of a disturbance detecting system installed in an enclosure wherein the acoustic conditions varied considerably over a period of about ten hours.

The regulated or sensitivity controlled output changed only slightly during this period, as the curve indicates and remained at about the midpoint between over and under sensitivity, whereby the system was conditioned to respond to the disturbance sought to be detected and was insensitive to false alarms.

On the other hand, the non-regulated output changed severely from an over sensitive condition to an under sensitive condition and again to an over sensitive condition. In fact, this output was within the range of the desired level of sensitivity for less than the 30% of the duration of the test.

Also, it was found that the regulated output could be maintained within closer limits by utilizing the sensitivity control network disclosed herein than by that of my prior application previously referred to.

From the foregoing description, it will be seen that the present invention provides an improved arrangement for controlling the sensitivity of apparatus for detecting distances in an enclosure, which arrangement is more accurate and reliable and yet is relatively simple and economical.

As various changes may be made in the forms, construction and arrangement of the parts herein, without departing from the spirit and scope of the invention and without sacrificing any of its advantages, it is to be understood that all matter herein is to be interpreted as illustrative and not in any limiting sense.

I claim:
1. The combination of means including an electronic detecting system for generating a sampling signal, and a control network having an input for receiving energy radiations and having an output connected to the input of said detecting system including an amplifying element for controlling the amplitude of the output, said network comprising a normally balanced resistance-type bridge including a first side having first and second resistors connected in series and including a second side having third and fourth resistors connected in series, a heater for said third resistor under the control of the sampling signal, a source of energy having a reference voltage connected across the junction of said first and second resistors and the junction of said third and fourth resistors, a reference heater for said fourth resistor connected across said source of energy, and an output connected across the junctions of the sides of said bridge for controlling said control element.

2. The combination of means including an electronic detecting system for generating a sampling signal, and a control network having an input for receiving energy radiations and having an output connected to the input of said detecting system and including a P-N-P transistor for controlling the amplitude of the output and having its base connected to one side of said control network input and its emitter connected to one side of said output, and including a unidirectional power supply having its positive terminal connected to the other side of said output and its negative terminal to the collector of said transistor, said network comprising a normally balanced resistance-type bridge including a first side having first and second resistors connected in series and including a second side having third and fourth resistors connected in series, a heater for said third resistor under the control of the sampling signal, a source of energy having a reference voltage connected across the junction of said first and second resistors and the junction of said third and fourth resistors, a reference heater for said fourth resistor connected across said source of energy, and an output connecting the junctions of the sides of said bridge to the other side of the network input and to the emitter of said transistor.

3. The combination of means including an electronic detecting system for generating a sampling signal, and a control network having an input for receiving energy radiations and having an output connected to the input of said detecting system and including a P-N-P transistor for controlling the amplitude of the output and having its base connected to one side of said control network input and its emitter connected to one side of said output, and including a unidirectional power supply having its positive terminal connected to the other side of said output and its negative terminal to the collector of said transistors, said network comprising a normally balanced resistance-type bridge including a first side having first and second resistors connected in series and including a second side having third and fourth resistors connected in series, a heater for said third resistor under the control of the sampling signal, a source of energy having a reference voltage connected across the junction of said first and second resistors and the junction of said third and fourth resistors, a reference heater for said fourth resistor connected across said source of energy, an output connecting the junctions of the sides of said bridge to the other side of the network input and to the emitter of said transistor, and a capacitor connected across said bridge output.

4. In a network for controlling the sensitivity of apparatus for detecting disturbances within an enclosure by detecting frequency changes between transmitted and received energy radiations, the combination of means including a detecting system for generating a sampling signal, and a control network having an input for receiving transmitted energy radiations and having an output connected to the input of said detecting system including an amplifying element for controlling the amplitude of the output, said network comprising a normally balanced resistance-type bridge including a first side having first and second resistors connected in series and including a second side having third and fourth resistors connected in series, a heater for said third resistor under the control of the sampling signal, a source of energy having a reference voltage connected across the junction of said first and second resistors and the junction of said third and fourth resistors, a reference heater for said fourth resistor connected across said source of energy, and an output connected across the junctions of the sides of said bridge for controlling said control element.

5. In a network for controlling the sensitivity of apparatus for detecting disturbances within an enclosure by detecting frequency changes between transmitted and received energy radiations, the combination of means including a detecting system for generating a sampling signal, and a control network having an input for receiving transmitted energy radiations and having an output connected to the input of said detecting system and including a P-N-P transistor for controlling the amplitude of the output, and having its base connected to one side of said control network input and its emitter connected to one side of said output, and including a unidirectional power supply having its positive terminal connected to the other side of said output and its negative terminal to the collector of said transistor, said network further comprising a normally balanced resistance-type bridge including a first side having first and second resistors connected in series and including a second side having third and fourth resistors connected in series, a heater for said third resistor under the control of the sampling signal, a source of direct current having a reference voltage connected across the junction of said first and second resistors and the junction of said third and fourth resistors, a reference heater for said fourth resistor connected across said source of energy, and an output connecting the junctions of side of said bridge to the other side of the network input and to the emitter of said transistor.

6. In a network for controlling the sensitivity of apparatus for detecting disturbances within an enclosure by detecting frequency changes between transmitted and received energy radiations, the combination of means including a detecting system for generating a sampling signal, and a control network having an input for receiving transmitted energy radiations and having an output connected to the input of said detecting system and including a P-N-P transistor for controlling the amplitude of the output, and having its base connected to one side of said control network input and its emitter connected to one side of said output, and including a unidirectional power supply having its positive terminal connected to the other side of said output and its negative terminal to the collector of said transistor, said network further comprising a normally balanced resistance-type bridge including a first side having first and second resistors connected in series and including a second side having third and fourth resistors connected in series, a heater for said third resistor under the control of the sampling signal, a source of direct current having a reference voltage connected across the junction of said first and second resistors and the junction of said third and fourth resistors, a reference heater for said fourth resistor connected across said source of energy, an output connecting the junctions of side of said bridge to the other side of the network input and to the emitter of said transistor, and a capacitor connected across said bridge output.

7. In combination, an electronic detecting system including an amplifier providing an operating signal, a detector connected to the output of said amplifier and means for generating an independent sampling signal; and a control network having an input for receiving energy radiations from said amplifier and having an output connected to the input of said detector and including a transistor for controlling the amplitude of the control network output and having its base connected to one side of said first mentioned input and having its emitter connected to one side of the control network output, said network further including a unidirectional power supply having one of its terminals connected to the collector of said transistor and having its other terminal connected to the other side of the control network output, said network still further including means under the control of the sampling signal providing an output having one side connected to the other side of said first mentioned input and having its other side connected to the emitter of said transistor.

8. Apparatus according to claim 7, wherein a capacitor is connected across the output of said means under the control of the sampling signal.

References Cited in the file of this patent

UNITED STATES PATENTS

| | | |
|---|---|---|
| 2,343,759 | Fairley | Mar. 7, 1944 |
| 2,673,340 | Johansson | Mar. 23, 1954 |
| 2,691,130 | Ingersoll | Oct. 5, 1954 |
| 2,745,089 | Levy | May 8, 1956 |
| 2,777,932 | Barr | Jan. 15, 1957 |
| 2,782,290 | Lannan | Feb. 19, 1957 |
| 2,794,974 | Bagno | June 4, 1957 |
| 2,825,789 | Scott | Mar. 4, 1958 |